March 15, 1955  R. J. GIBSON ET AL  2,704,138
ROTARY BRAKE

Filed Jan. 28, 1954  2 Sheets-Sheet 1

Richard J. Gibson
Earl J. McCullough
INVENTORS

March 15, 1955  R. J. GIBSON ET AL  2,704,138
ROTARY BRAKE

Filed Jan. 28, 1954  2 Sheets-Sheet 2

Richard J. Gibson
Earl J. McCullough
INVENTORS

BY
Attorneys

United States Patent Office 2,704,138
Patented Mar. 15, 1955

2,704,138

ROTARY BRAKE

Richard J. Gibson, Verona, and Earl J. McCullough, Pittsburgh, Pa.

Application January 28, 1954, Serial No. 406,688

5 Claims. (Cl. 188—80)

This invention relates to an auxiliary brake for trailers, trucks, and buses as well as other large motor vehicles and the primary object of the invention resides in the provision of means for providing a supplemental braking action on the wheels of a vehicle to enable the vehicle to be more quickly and safely brought to a stop.

The construction of this invention features the provision of means adapted to engage the wheels of a vehicle remote from the center of rotation thereof which is adapted to be operated by supplemental means from the means for normally actuating the conventional brakes provided for the vehicle. This rotary brake is adapted to be pivotally mounted on the frame of the vehicle and is resiliently floatingly held out of engagement with the wheels except when braking action is desired.

One of the particular features of the invention resides in the construction of the resilient friction members and the brake drum as well as the brake shoe which is resiliently held out of engagement with the brake drum until actuated.

Still further objects and features of this invention reside in the provision of a rotary auxiliary brake which may be easily attached to various makes and models of vehicles which is simple in construction and installation, and which is highly effective in operation. These, together with the various ancillary objects and features of the invention which will become apparent as the following description proceeds, are attained by this rotary brake, a preferred embodiment of which has been illustrated in accompanying drawings, by way of example only, wherein.

Figure 1:
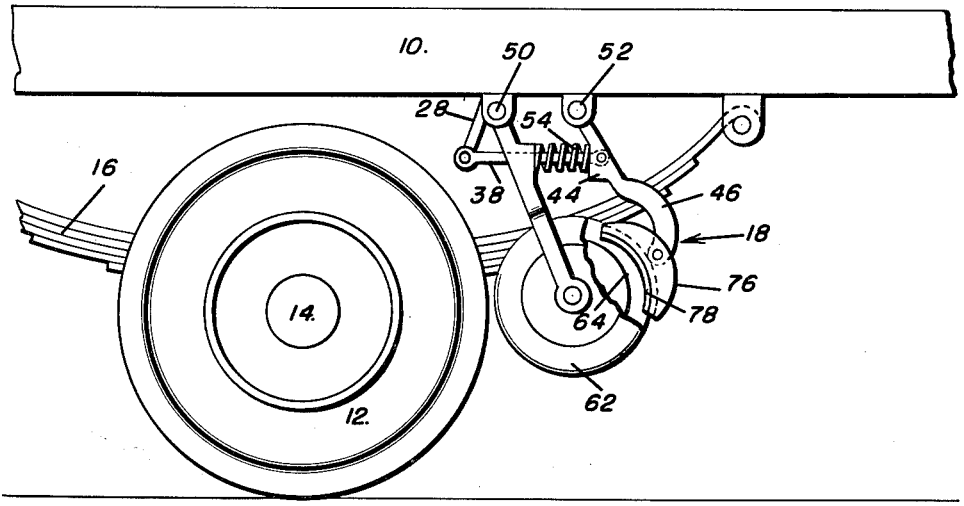
Figure 1 is a side elevational view of the rotary brake shown in a non-actuated position.
Figure 2:
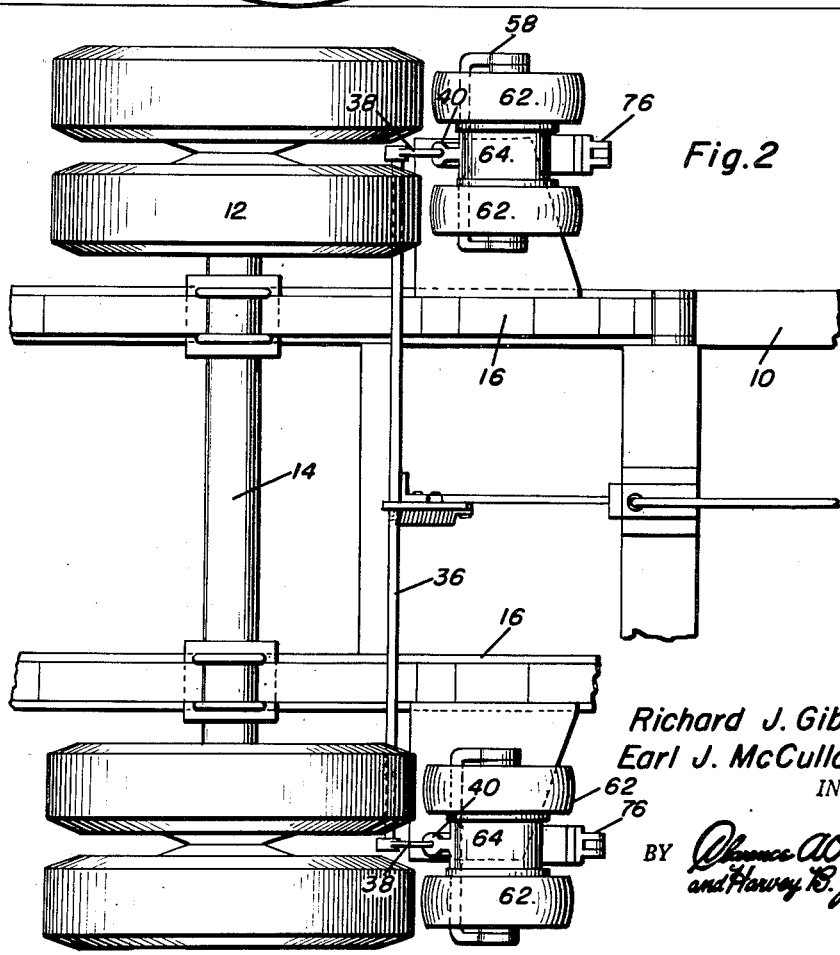
Figure 2 is a bottom plan view of this rotary brake as installed on a vehicle.
Figure 3:
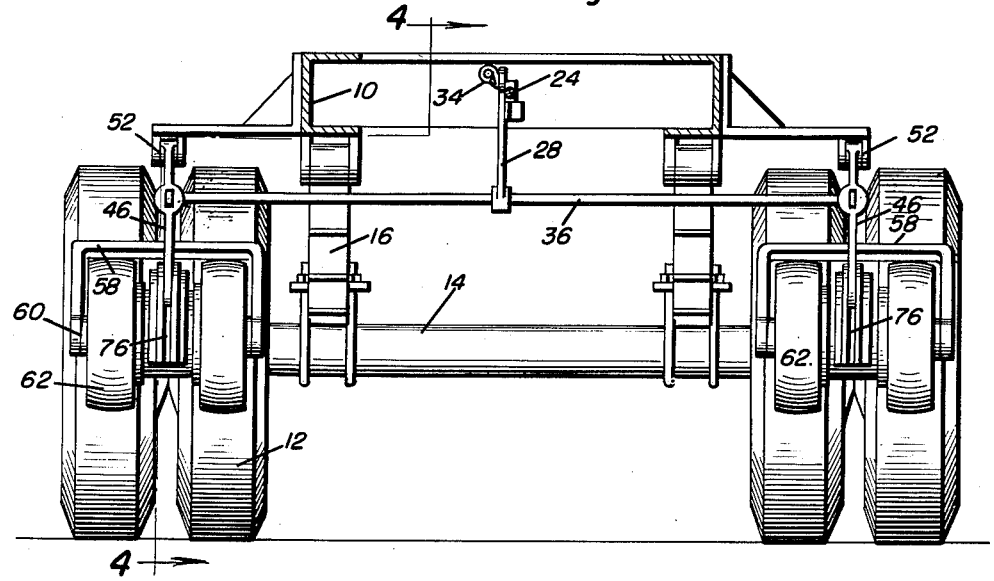
Figure 3 is a front elevational view of the rotary brake.

With continuing reference to the accompanying drawings wherein like reference numerals designate similar parts throughout the various views, reference numeral 10 generally designates the frame of a vehicle having wheels 12 mounted on an axle 14 suspended by springs 16 in the conventional manner.

The vehicle 10 is provided with a conventional braking arrangement which is adapted to stop the rotation of the wheels 12. However, the rotary brake generally indicated by reference numeral 18 and comprising the present invention is adapted to be utilized as an auxiliary brake so that the wheels 12 may be brought to a stop more rapidly than would be possible utilizing the conventional brake independently. This auxiliary rotary brake 18 may be actuated by hydraulic or mechanical means. In the embodiment shown in the drawings hydraulic means are utilized and a cylinder 20 having a piston 22 mounted therein is suspended from the frame 10 and is adapted to be supplied with hydraulic fluid through a conduit 25 which supplied the fluid to the cylinder 20 when it is desired to utilize the rotary brake assembly 18. Attached to the piston 22 is a piston rod 24 which is pivotally attached as at 26 to a crank arm 28 pivotally mounted as at 30 on the frame 10. A projecting portion 32 is provided for the crankshaft 28 and a spring 34 is terminally connected to this projection 32 and to the frame 10 both to continuously urge the crankarm 28 and hence the piston rod 24 as well as the piston 22 into initial, non-actuated position.

The crank arm 28 is rotatably attached to a shaft 36 which extends transversely of the frame 10 of the vehicle and to which there is also pivotally attached a pair of operating rods 38. The operating rods 38 extend through cylindrical casing 40 on brake holders 42 as well as into cylindrical housings 44 on brake shoe holders 46. The operating rods 38 are pivotally attached as at 48 to the brake shoe holders 46.

The brake holders 42 are pivotally attached as at 50 to the frame 10 while the brake shoe holders 46 are pivotally attached as at 52 to the frame 10.

A coil spring 54 is concentric with each of the operating rods 38 and is attached to, as by welding or the like, and extends between each of the casings 40 and housings 44. The spring 54 is adapted to resiliently hold the brake shoe holder 46 outwardly away from the brake holder 42 and to hold the brake holder 42 outwardly away from the wheel 12 when the auxiliary brake arrangement 18 is in a non-actuated position.

Figure 5:
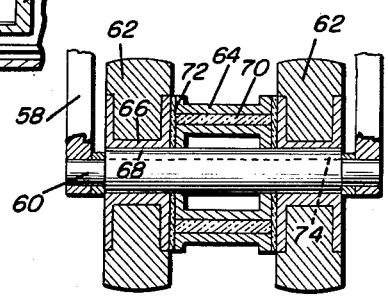
Figure 5 is a sectional detail view as taken along the plane of line 5—5 of Figure 4.

Each of the brake holders 42 include upper portions 56 which carry the cylindrical casings 40. Connected to each of the upper portions 56 is a substantially U-shaped yoke 58 within which shafts 60 are journalled. As can be best seen in Figure 5 there are mounted on each of the shafts 60 a pair of resilient friction members 62 spaced by a brake drum 64. The resilient friction members 62 may be in the form of solid rubber tires mounted on rims 66, the rims being provided with keyways 68 therein. The brake drums 64 may be in the form of hollow drums having heat insulation 70 laminated therein. Between the drum 70 and the friction member 62 there be provided asbestos insulating washers 72. The drum 70 is likewise provided with a keyway therethrough and a key 74 secures the resilient friction member 62 as well as the drum 64 removably though non-rotatably on the shaft 60.

The brake shoe holder 46 has pivotally mounted thereon a brake shoe 76 having a lining 78 of a softer metal than the metal from which the brake drum 64 is constructed thereby enabling the frictional wear to be substantially limited to that of the brake shoe lining 78. The brake shoe 76 may be readily replaced upon removal of the means 80 used to pivotally mount the brake shoe 76.

Figure 4:
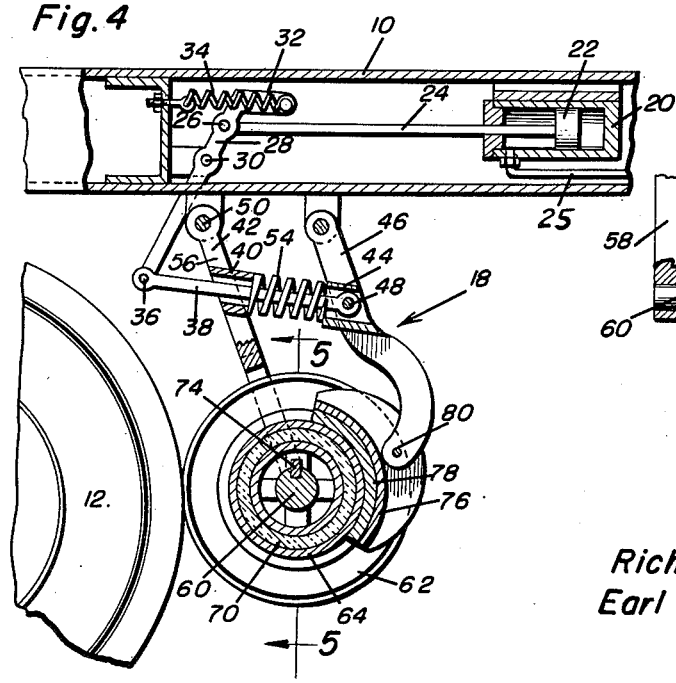
Figure 4 is a vertical sectional view as taken along the plane of line 4—4 in Figure 3 illustrating the rotary brake in an actuated position.

This apparatus is operated as follows: With the piston 22 in a non-actuated position, fluid under pressure is introduced into the cylinder 22 through the conduit 25 thus moving the piston 22 and hence the piston rod 24 to the position as is shown in Figure 4 thus pivoting the crankarm 28 and actuating the operating rods 38. This will permit the brake holders 42 to fall into engagement with the wheels 12 causing these friction members 62 to rotate. Further actuation of the operating rods 38 causes the brake shoe holder 46 to be pulled inwardly causing the brake shoe 76 to engage the brake drum 64. Further, the brake shoe will tend to stop the rotation of the brake drum 64 and hence of the friction member 62 which are in engagement with the wheels, the friction member 62 thus braking the rotation of the wheels 12.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A rotary brake for the wheels of a vehicle comprising a brake holder pivotally attached to the vehicle, a shaft journalled in said brake holder, a pair of resilient friction members removably secured to said shaft, a brake drum removably secured to said shaft between said resilient friction members, a brake shoe holder pivotally attached to the vehicle, a brake shoe connected to said brake shoe holder, and means for urging said resilient friction members into engagement with said wheels and said brake shoe into engagement with said brake drum, said means including a cylindrical housing on said brake shoe holder, a tubular casing on said brake holder, an operating rod pivotally attached to said brake shoe holder within said housing, said rod extending through said casing, and a spring concentrically positioned about said rod secured to and extending between said casing and said housing.

2. A rotary brake for the wheels of a vehicle comprising a brake holder pivotally attached to the vehicle, a shaft journalled in said brake holder, a pair of resilient friction members removably secured to said shaft, a brake drum removably secured to said shaft between said resilient friction members, a brake shoe holder pivotally attached to the vehicle, a brake shoe connected to said brake shoe holder, and means for urging said resilient friction members into engagement with said wheels and said brake shoe into engagement with said brake drum, said means including a cylindrical housing on said brake shoe holder, a tubular casing on said brake shoe holder, an operating rod pivotally attached to said brake shoe holder within said housing, said rod extending through said casing, and a spring concentrically positioned about said rod secured to and extending between said casing and said housing, said operating rod being pivotally attached to a crank arm, and hydraulic means for actuating said crank arm.

3. A rotary brake for the wheels of a vehicle comprising a brake holder pivotally attached to the vehicle, a shaft journalled in said brake holder, a pair of resilient friction members removably secured to said shaft, a brake drum removably secured to said shaft between said resilient friction members, a brake shoe holder pivotally attached to the vehicle, a brake shoe connected to said brake shoe holder, and means for urging said resilient friction members into engagement with said wheels and said brake shoe into engagement with said brake drum, said means including a cylindrical housing on said brake shoe holder, a tubular casing on said brake holder, an operating rod pivotally attached to said brake shoe holder within said housing, said rod extending through said casing, and a spring concentrically positioned about said rod secured to and extending between said casing and said housing, said operating rod being pivotally attached to a crank arm, and hydraulic means for actuating said crank arm, and resilient means connected to said crank arm and the vehicle for urging said crank arm to an initial position.

4. A rotary brake for the wheels of a vehicle comprising a brake holder pivotally attached to the vehicle, a shaft journalled in said brake holder, a pair of resilient friction members removably secured to said shaft, a brake drum removably secured to said shaft between said resilient friction members, a brake shoe holder pivotally attached to the vehicle, a brake shoe connected to said brake shoe holder, and means for urging said resilient friction members into engagement with said wheels and said brake shoe into engagement with said brake drum, said means including a cylindrical housing on said brake shoe holder, a tubular casing on said brake holder, an operating rod pivotally attached to said brake shoe holder within said housing, said rod extending through said casing, and a spring concentrically positioned about said rod secured to and extending between said casing and said housing, said brake drum and said resilient friction members having recesses therein, said shaft having a slot therein and a key extending through said recesses and said slot, non-rotatably mounting said brake drum and said resilient friction members on said shaft and holding said resilient friction members against relative rotation with respect to said brake drum.

5. A rotary brake for the wheels of a vehicle comprising a brake holder pivotally attached to the vehicle, a shaft journalled in said brake holder, a pair of resilient friction members removably secured to said shaft, a brake drum removably secured to said shaft between said resilient friction members, a brake shoe holder pivotally attached to the vehicle, a brake shoe connected to said brake shoe holder, and means for urging said resilient friction members into engagement with said wheels and said brake shoe into engagement with said brake drum, said means including a cylindrical housing on said brake shoe holder, a tubular casing on said brake holder, an operating rod pivotally attached to said brake shoe holder within said housing, said rod extending through said casing, and a spring concentrically positioned above said rod secured to and extending between said casing and said housing, said operating rod being pivotally attached to a crank arm, and hydraulic means for actuating said crank arm, and resilient means connected to said crank arm and the vehicle for urging said crank arm to an initial position, said brake drum and said resilient friction members having recesses therein, said shaft having a slot therein and a key extending through said recesses and said slot non-rotatably mounting said brake drum and said resilient friction members on said shaft and holding said resilient friction members against relative rotation with respect to said brake drum, said brake drum having a lesser diameter than the diameter of said resilient friction members.

References Cited in the file of this patent

FOREIGN PATENTS

| | | |
|---|---|---|
| 341,920 | Great Britain | Jan. 23, 1931 |
| 286 | Italy | Sept. 30, 1859 |